E. Stierli.
Making Bronze.
No. 3,479. Reissued Jan. 1, 1869.
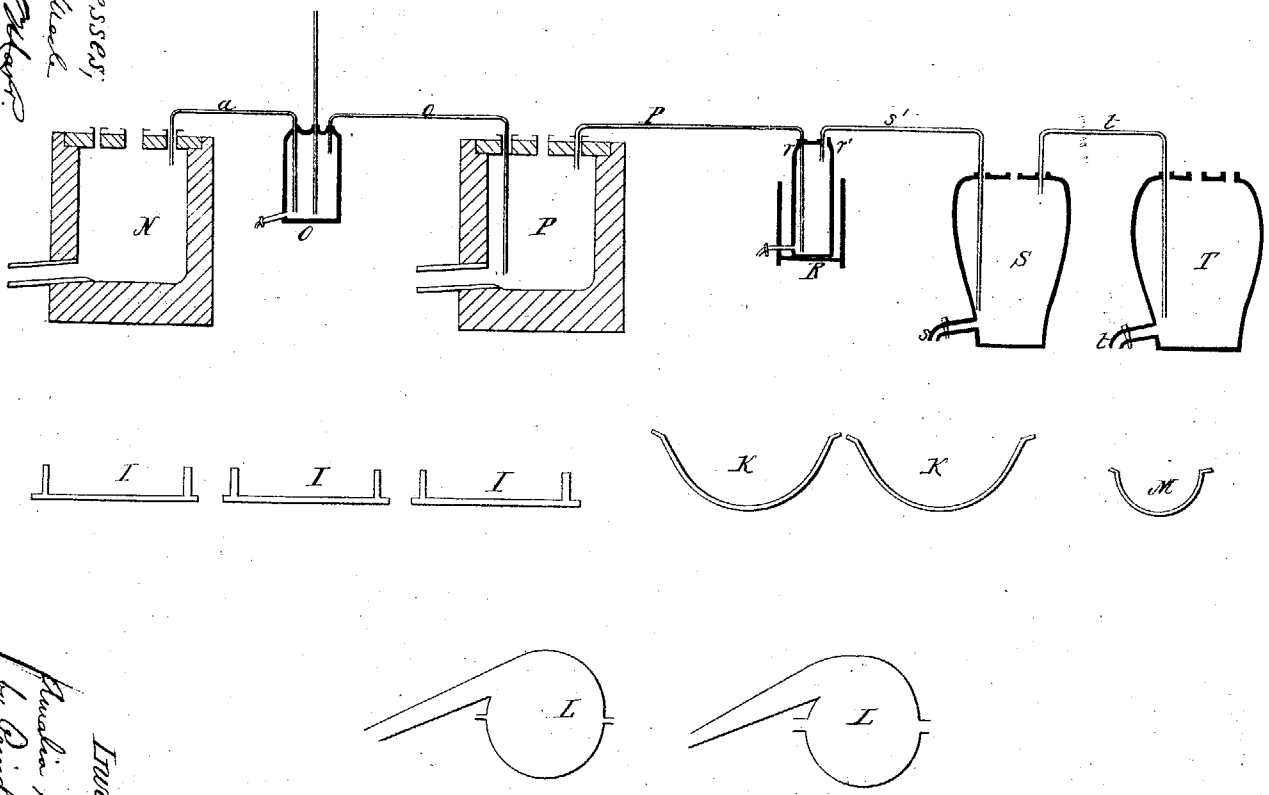
Witnesses;
A. E. Schmeh
Paul J. Harr.
Inventor;
Amalia Stierli
by Prindle & Byers
Attys.

United States Patent Office.

AMALIE STIEREN, OF NATRONA, PENNSYLVANIA, ASSIGNEE, BY MESNE ASSIGNMENTS, OF EDWARD STIEREN, DECEASED.

*Letters Patent No.* 12,077, *dated December* 12, 1854; *extended seven years; reissue No.* 3,479, *dated June* 1, 1869.

DIVISION A.

IMPROVED PROCESS OF TREATING THE MOTHER-WATER OF SALINES TO OBTAIN USEFUL PRODUCTS.

The Schedule referred to in these Letters Patent and making part of the same.

*To all whom it may concern:*

Be it known that EDWARD STIEREN, deceased, late of Allegheny county, in the State of Pennsylvania, did, on the 12th day of December, 1854, obtain of and from the United States of America, certain Letters Patent for and upon "Improvements in Process for Treating the Mother-Water of the Salines," which Letters Patent were duly extended on the 12th day of December, 1868, for a further period of seven years from that date, and which said Letters Patent have been found to be defective, in that certain mistakes were made in the specification, and certain ambiguities exist in the claim thereof, by reason of which said specification and claim do not cover and embrace all of the original invention and improvements; now, therefore, I, AMALIE STIEREN, widow of the aforesaid EDWARD STIEREN, and assignee of the entire interest in the aforesaid Letters Patent, being desirous to reissue the said Letters Patent, herewith surrendered, in two divisions, as stated in the accompanying petition, have prepared specifications and drawings of the said original invention and improvements; and do hereby declare that the following is a full, clear, exact, and more complete description of the aforesaid process, and in connection therewith, and as explanatory thereof, a partial description of the apparatus, which is fully described and claimed in the second division of this reissue, bearing even date herewith.

To enable others skilled in the science of chemistry to use this invention, I will proceed to describe the process.

After the extraction of the common salt of commerce, the bitter water of the salines, which is then of a density of 30° to 32° Baumé's hydrometer, or of a specific gravity of 1.261 to 1.280, is no longer considered of any value for the manufacture of common salt, and is drawn off from the boiling-pans.

To obtain from water of the above strength a lye suitable to the purpose, the said bitter water is placed in a pan and evaporated to 36° Baumé, or a specific gravity of 1.33.

This concentrated lye is drawn from the pan into a basin of suitable dimensions, made tight and sunk in the ground. Lime, mixed with water to the consistence of milk, is then added in sufficient quantities to decompose the chloride of magnesium contained in said lye, and the magnesia is then precipitated as a hydrate. The mixture in the basin will form a thin slush, containing chloride of calcium, precipitated hydrate of magnesia, and combinations of bromine and iodine. This slush is then, by means of a pump, drawn into tubs, having in the middle of each a wooden pyramid, on the four sides of which, at suitable distances, there is a number of holes. The pyramids must be wrapped with loose woven linen, so that the slush may not escape before it is pumped out, while the liquor, in which the hydrate of magnesia was suspended, passes off by filtration through the holes. The hydrate, being a denser body, remains between the pyramids and the sides of the tubs. The tubs are placed upon timbers over another busin, like the first, sunk in the ground, rendered tight, and of a sufficient capacity. Each of the tubs is provided with a tap in the bottom, capable of being opened and shut. The tubs, containing the pyramids, being filled with the slush drawn off from the first basin, and the taps in the tubs opened, the lye required is drawn into the second basin, the hydrate of magnesia remaining as a denser mass. The lye then drawn off will have a specific gravity of 1.208 to 1.261, according as more or less liquid hydrate of lime has been added. The lye being all drawn off, the taps in the bottom of the tubs are closed, water introduced, and the hydrate of magnesia in the tubs well stirred. After remaining some time, the taps are opened, the lye drawn off, and said taps again closed. This is to be repeated until the liquor drawn off has a density of from 5° to 6° of Baumé, and a specific gravity of 1.036 to 1.043. The lye, which has separated from the hydrate of magnesia, by filtration through the pyramids, and containing chloride of calcium, with combinations of bromine and iodine, is pumped into a wooden vat, to be used for obtaining iodine and bromine.

The hydrate of magnesia having been washed until the water flowing from the tubs no longer contains any portion of salt, (which may be ascertained by adding to the clear, filtered fluid, a few drops of the solution of nitrate of silver, when, if no salt remains, the water does not become turbid, and no more precipitate is produced,) is then conveyed into a leaden cistern, which, for safety, must be enclosed in a strong wooden box. It is then mixed with water and stirred, after which dilute sulphuric acid of about 45° to 50° Baumé, or of the specific gravity of 1.455, to 1.530, must be added until the liquor is neutralized, or until litmus paper is not tinged thereby. This liquor, now a sulphate of magnesia, is suffered to remain some hours undisturbed so that any impurity may be deposited as sediment.

After the liquor has become clear, it is drawn into a pan, and boiled until a sample, being taken out for proof, shows a strength of 33° Baumé, and a specific gravity of 1.295, when the fire is to be withdrawn, the furnace-door left open, and the liquor, after clearing itself, drawn off from the pan by a siphon of lead and conveyed by a wooden spout into crystallizing-vessels, provided for the purpose, and put in a sheltered, cool, airy place. In cool weather the crystallization is accomplished in twenty-four hours, after which time the liquor remaining on the sulphate of magnesia is drawn off by a siphon, returned to the pan, and again boiled, either by itself or with the addition of fresh liquor, until brought to a strength of 33° Baumé, when it is put into the crystallizing-vessels, as before.

The crystallized salts are then put into a draining-vessel, in the form of an inverted cone, with numerous holes in the bottom of the small end, so that the remaining lye may be drained off, the top, or larger end of the vessel remaining open.

For the purpose of drying, the salts thus collected in the draining-vessels, when entirely free from the liquor, are spread on hurdles, covered with paper, and placed, in summer, in an open, airy loft, and in winter, in a close, warm room.

As soon as the crumbling salts become so dry as not to adhere to the fingers, they may be packed in barrels for the purpose of commerce.

Proper care, which can only be learned by practical experience, must be taken to prevent the liquor from becoming dark-colored, or the salt from being injured in appearance, or in its crystals, by being exposed to too quick or too great a heat.

It is well known that in the gas-formed chlorine, as well as its solution in water, the bromine is separated from their bromides.

It is well known that iodine has a peculiar property of forming, with copper, a combination insoluble in water, but the bromide and chloride of copper are both easily dissoluble in water, and upon these facts is based this method of extracting the bromine from iodine.

From the lye separated from the hydrate of magnesia by filtration are obtained bromine and iodine.

The said lye now contains chloride of calcium, bromide and iodide of calcium, and to it is added a concentrated solution of sulphate of soda, and the mass agitated until the combinations are nearly all decomposed.

By the decomposition aforesaid, the sulphuric acid of the sulphate of soda unites with the lime formed by the union of the oxygen of the soda with the calcium of the chloride of calcium, forming the insoluble sulphate of lime, which falls to the bottom. At the same time, the nascent chlorine liberated from the calcium unites with a portion of the nascent sodium of the solution of the sulphate of soda, thereby forming the chloride of sodium, while another portion of the sodium unites with the iodine and bromine, forming iodide and bromide of sodium. This mixed solution of chloride, bromide, and iodide of sodium, which remains on the sulphate of lime, soon becomes clear, and is drawn off by a spigot above the bottom of the vat, and conveyed into an iron pan. After applying water, the sediment remaining is again stirred, and the liquor, when clear, put into the pan, which operation is repeated until the lye is no longer worth boiling, being only from 3° to 4° Baumé.

The lye in the pan is to be boiled until the dissolved sulphate of lime not previously precipitated begins to separate, and the chloride of sodium shows itself, by funnel-shaped crystals in the boiling lye, when the heat must be reduced, and the liquor allowed to settle, after which it is taken out and suffered to cool in wooden vessels.

The lye, when sufficiently cooled, is next put into cast-iron kettles, of suitable dimensions, and, by a quicker, but careful boiling, pure refined table-salt, or chloride of sodium, is obtained. This salt, which is precipitated during the boiling, must be taken out by a wooden shovel, and placed in baskets over the kettles. The liquor which remains after the extraction of the salt is now ready for use in obtaining bromine and iodine.

The liquor which remains after extracting the chloride of sodium is put into a tight tub, of less width than height, and a solution added, containing one part of crystallized sulphate of copper and two and a half parts of sulphate of iron, (copperas,) which forms a muddy precipitate.

By using a solution of sulphate of copper without the solution of the sulphate of iron, it would precipitate about one-half of the iodine, as basic iodide of copper insoluble in water, and the other half of iodine, would remain in the lye.

By means of the addition of the sulphate of iron, all the iodine will be precipitated as iodide of copper, because the protoxide of iron contained in the sulphate of iron, (copperas,) absorbs the oxygen of the copper-oxide of the sulphate of copper, and forms sulphate of peroxide of iron.

Upon the precipitate of iodide of copper, when settled, there remains a clear, brown-colored liquor, which is to be drawn off, and kept for further use. Water must then be put upon the precipitate, and stirred, and, when settled, the liquor taken off and mixed with the first liquor, for the extraction of bromine.

The precipitate must be well edulcorated with water, collected on a filter, then dried by a moderate heat, and triturated to powder, after which it must be mixed with from one and one-half to two parts of pulverized manganese, and placed in a cast-iron retort, which is connected with a glass receiver.

After the retort has been set in a fire-brick furnace, a slow fire should be applied, and gradually increased, by which means, at first, steam escapes, and is condensed in the receiver, and then the iodine rises as a violet-colored vapor, condensing in the neck of the retort, and in the neck of the receiver, in the form of small, dark-gray, shining scales.

The liquor remaining after the separation of the iodide of copper, (iodine,) and containing bromide of sodium, with chloride of sodium, is placed in a small cast-iron kettle, and strongly heated, after which a solution of carbonate of soda, or of caustic soda, is added from time to time, until a filtered sample appears but slightly turbid. It is now boiled slowly, when crystals of chloride of sodium appear on the surface, and then fall to the bottom. If, after cooling, a sample now shows a strength of 36° Baume, or a specific gravity of 1.33, the fire should be removed, and the door of the furnace left open. The liquor, when cool, is drawn off, to be used in the extraction of bromine.

The apparatus used in this latter part of the process will first be described, in order to better illustrate said process.

In the annexed drawing—

N and P represent two four-sided vessels, worked out of fine sandstone, granite, or porphyry. Said vessels are three feet wide, and three and a half feet high outside, and two feet wide and thirty-three inches deep inside.

The vessel N has a closely-fitting cover, worked out of the same material as the vessels, and in said cover are three tubes, the middle four inches and the others two inches in diameter each. They are cut out of the same piece as the cover, and may be closed by stoppers of burnt clay.

Close to the bottom there is a round hole, slightly slanting, about five inches in diameter, into which a cast-iron pipe, three inches inside diameter and fifteen inches long, may be inserted. This pipe is protected inside by a lining of lead one-fourth of an inch thick, and is cemented inside and outside by lead poured in a melted state into the stone vessel, so that the liquid contained in said vessel may not come in direct contact with the iron pipe. The outer end of said pipe may be closed by a wooden stopper.

In the cover of vessel P there are also three tubes, the middle one of which is three inches in diameter, and capable of being at times closed with a stopper of burnt clay; the second is two inches in diameter, and serves to receive a leaden pipe; while the third is one and one-fourth inch in diameter, and is intended for the reception of a glass pipe.

A short distance from the bottom of the vessel P is attached a cast-iron pipe, lined with lead, as in the vessel N. There is also on one of the four sides of each vessel N and P, and about twenty-four inches from the bottom, a hole one and one-half inch in diameter, through which enters a cast-iron pipe, and passes in a spiral manner through the vessel, and out on the opposite side, to suffer the condensed steam to escape. Said pipes must be covered with lead the whole of their length, inside of the vessels N and P, and, being connected with a boiler, both vessels are supplied with the steam required.

The vessel O is, like the other three, R, S, and T, constructed of earthenware or burnt clay, and has, at a short distance from the bottom, a cock, and upon its top three tubes, each two inches high, the middle tube being one inch in diameter, and intended to receive a glass pipe. This vessel is eighteen inches high and twelve inches wide. The vessel R is two feet high and eight inches in diameter, and is placed in a water-tight wooden vessel from fourteen to fifteen inches in diameter, and about sixteen inches high.

Near the bottom of this said vessel R is a cock, and upon its top two short tubes, *r* and *r'*, each two inches long. The tube *r* being one and one-fourth inch in diameter, furnishes a passage for a glass pipe, while the other tube, *r'*, is two inches in diameter, and is intended for the reception of a lead pipe.

The two vessels S and T are each three feet high and two feet in diameter, and are provided with cocks, *s* and *t*, near their bottoms, and with three tubes, two inches high and two inches in diameter, passing through their tops.

The two sandstone vessels, N and P, must be coated on the outside with a heated composition of one part pitch, three parts coal-tar, and one-eighth part of plaster of Paris, applied by means of a brush, and are ready for use when the mixture is well absorbed and dried.

As a cement for tightening the pipes, a tenacious mixture of powdered clay, with flaxseed-oil and a little plaster of Paris, may be used.

In putting together the apparatus, the vessel N is connected with the vessel O by a lead pipe, *n*, bent in the form of a siphon, and reaching almost to the bottom of the vessel O, in which water is placed to the depth of about two inches.

In the middle tube of vessel O is placed a glass pipe, *n'*, (called a safety-pipe,) which is two and one-half feet long, and reaches nearly to the bottom of said vessel.

A siphon-shaped lead pipe, *o*, connects vessels O and P, reaching within about three inches of the bottom of the latter vessel, which is in turn connected with vessel R by a glass pipe, *p*, also siphon-shaped, reaching to within from two to one and one-fourth inch of the bottom of the latter vessel. The wooden vessel *m* which vessel R is placed, is so constructed as that cold water may flow in and out, or it may hold ice for the purpose of cooling.

By means of lead pipes, *s'* and *t'*, the vessel R is connected with vessel S, and this, in turn, with vessel T.

When all the pipes are rendered air-tight, by means of the cement before described, there is put into vessel N, through the centre opening, a portion of pulverized manganese, and one part water, and said opening then closed by means of the burnt-clay stopper and cement. The vessel P is now two-thirds filled through the centre tube with the lye containing bromine, or with the last remaining lye, and then the vessel well closed.

A solution of caustic soda, or of carbonate of soda, of about 14° to 15° Baumé, is placed in vessels S and T, the first being about two-thirds and the latter one-half full. After this, the middle tube in each of the vessels S and T, is closed with a burnt earthen stopper, leaving the last tube in vessel T open, for the purpose of allowing the atmospheric air to escape.

There is then poured into vessel N, through one of the two-inch tubes which remains open, two and three-fourth parts of muriatic acid, of 19° to 20° Baumé, or specific gravity of 1.150 to 1.160, when this tube is also closed by an air-tight stopper, and the apparatus left for half an hour undisturbed. After this space of time, steam must be conveyed into vessel N by means of the steam-pipe, and the same passed through for about half an hour, after which said steam must be passed through the vessel P by the steam-pipe connecting with it. There will now be seen a dark red vapor passing through the glass pipe, connecting vessels P and R, the greater part of which is condensed as a fluid (bromine) in vessel R, while one part passes off as a gas to vessel S, and thence to vessel T, where it is absorbed by the solution of soda.

The steam must be conveyed through the mixture in vessel N, and also without interruption through the lye in vessel P, and continued until the vapor, which goes from the vessel P to vessel R, through the glass pipe, no longer appears red-colored, but clearer, and approaching to yellow. The distillation will now be interrupted by shutting off the steam from the two vessels N and P, and then the stopper of the four-inch hole in the cover of vessel N is to be taken out.

After the cooling of vessel N, the wooden stopper of the iron pipe, lined with lead, is to be removed, and the refuse which flows out may be used in preparing chloride of manganese for dyeing and cotton-printing works.

The contents of vessel O is a muriatic acid of no value, and the contents of vessel P are a worthless common salt, both of which substances may be thrown away.

In order that the bromine in vessel R, condensed to a fluid, may be rendered pure, it must now be rectified through a glass retort, by fused chloride of calcium, and put up in glass bottles with concentrated sulphuric acid.

When the fluids in the vessels S and T contain much free or predominant alkali, they are left in said vessels, and used during the next operation for the purpose of absorbing the bromine.

When the fluids in vessels S and T are saturated, and will absorb no more bromine, they must be boiled to dryness in a cast-iron kettle, and made red hot for a short time. This moderate annealing is done in order to decompose the bromate of soda which is formed, together with the bromide of sodium, and all to convert it into a bromide.

The moderate annealed bromide of sodium is to be pulverized, dissolved, and then evaporated to crystallization.

The crystallized bromide of sodium is fit for the purpose of commerce, or, if not, the crude annealed bromide is to be dissolved in a small quantity of water, and this solution is to be put into the vessels S and T during the next operation.

Having thus fully set forth the nature and merits of this invention,

What is claimed as new, is—

The herein-described process for obtaining the crystals of the sulphate of magnesia from bittern-water of saline springs.

Also, the herein-described process for obtaining iodine from the bittern-waters of saline springs.

Also, the herein-described process for obtaining bromine from the bittern-waters of saline springs.

In testimony whereof, I have, on this 8th day of May, 1869, hereto affixed my name, in the presence of two witnesses, to wit—

AMALIE STIEREN.

Witnesses:
W. H. NISBET,
J. G. D. FINDLEY.